Sept. 22, 1959  B. J. LONG  2,904,919
UNDER ICE TOWING AND LAUNCHING DEVICE
Filed Sept. 25, 1957

INVENTOR.
BEN J. LONG
BY
ATTORNEY

2,904,919
UNDER ICE TOWING AND LAUNCHING DEVICE

Ben J. Long, Minneapolis, Minn.

Application September 25, 1957, Serial No. 686,097

7 Claims. (Cl. 43—4)

This invention relates broadly to under ice towing and launching devices and, more particularly, to a fishing lure towing or launching device capable of traversing a body of water in any direction for considerable distances under its own power under the ice sheet, and thence retrieved manually to its starting point.

The principal object of this invention is to provide a device of the class described capable of traversing a body of water under the ice sheet under its own power.

Another object of this invention is to provide an under ice towing and launching device capable of towing and/or carrying a conventional tackle assembly to a desired spot and thence launching the same to be retrieved by conventional means.

Another object of this invention is to provide a device of the class described capable of towing an object under ice to a desired spot or location under its own power, and thence depositing or supporting said object at said location.

Another object of this invention is to provide an under ice towing and supporting device for a fishing tackle wherein a tackle assembly connected to the motivating means will have action imparted thereto in a forward horizontal plane by the travel of the unit and staggered vertical movement by the manipulation of the motivating means according to water levels, thus imparting life-like swimming movement to an attached tackle assembly.

Another object of this invention is to provide an under ice towing and launching device for a fishing tackle wherein its forward movement is halted only when the downward projection of its motivating means by force of gravity is interrupted only by the contact of said means with the water bottom or the strike of a fish striking the same as the motivating means is projected downwardly by virtue of its weight and the force of gravity.

These and other objects will become apparent from the following specification and claims taken in conjunction with the accompanying drawing, which forms a part of this application, and in which like characters indicate like parts throughout the several views.

Referring to the drawing.

It is important to note at this point that the device to be hereinafter described must be buoyant for reasons that will become apparent. It has been found that several synthetic materials are eminently successful for this purpose because of their stability and freedom from warping and swelling caused by absorption of water, factors which must be eliminated in the construction of this device to insure its proper and continued operation. With the foregoing in mind, it will be understood that the main elements to be hereinafter described are fabricated to achieve buoyancy and thus it will not be deemed necessary to refer to each of said elements as being of buoyant nature.

The numeral 4 indicates an identical pair of transversely spaced side plates which, in side elevation, are somewhat in the shape of an inverted triangle, the base portion of which is slightly concave in a longitudinal plane for reasons that will later become apparent. It will be understood, however, that the above described triangular shape is not critical and is shown primarily in the interest of achieving lightness of weight and avoiding unnecessary bulk of material.

Figure 1:
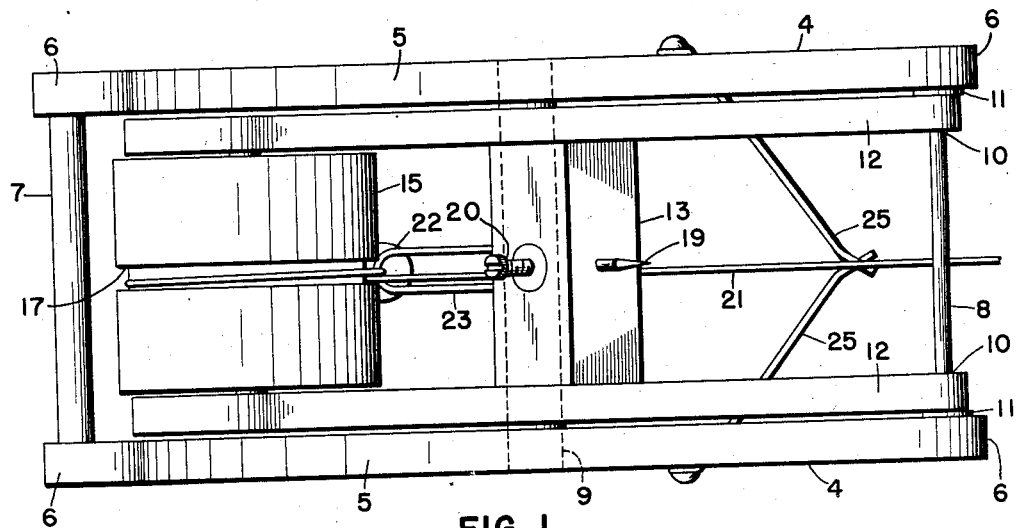
Fig. 1 is a top plan view of the invention.
Figure 2:
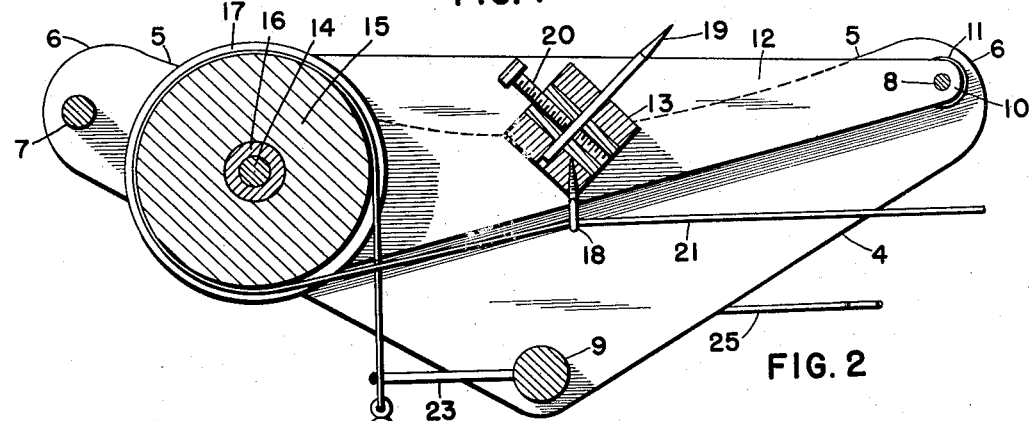
Fig. 2 is a side elevational view of the same.
Figure 3:
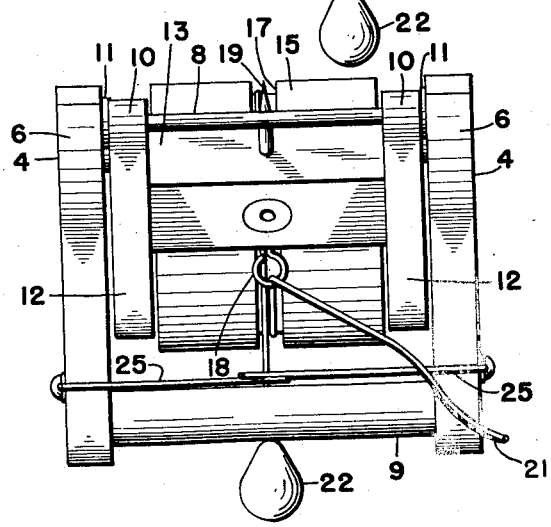
Fig. 3 is a rear elevational view thereof.

The upper edge portions of the side plates 4 are slightly concave, as indicated by the numeral 5 in Fig. 2, to avoid friction and drag on the under surface of the ice sheet, not shown, and the respective end portions thereof are rounded, see numeral 6, to afford opposite pairs of ice engaging skids or four point contact with the under surface of the ice sheet against which the device rides because of its inherent buoyancy.

The side plate members 4 are rigidly connected to form a solid frame by front and rear crosstie members 7 and 8, and lower crosstie members 9.

A transversely elongated secondary floating frame is pivotally mounted at its rearward end portion, see numeral 10, to the crosstie member 8 of the main frame and is transversely spaced therefrom by a pair of spacer washers 11, to thus afford vertical pivotal movement of the secondary frame within the main frame 4. This secondary frame comprises identical side plate members 12, a central spacer block 13, and a front crosstie member 14, said members 13 and 14 being constructed and dimensioned to afford the same clearance provided by the spacer washers 11 between side plate members 4 of the main frame and the side plate members 12 of the secondary floating frame. A hollow drum 15 is mounted for free axial rotation in either direction on rear crosstie member 14 of the secondary frame between side plate members 12 of said frame and spaced therefrom on either side thereof by a pair of bushings 16 having outwardly projecting shoulders, thus affording a pair of spacers. It will be understood that the drum 15 must be mounted on the crosstie member 14 in such a manner that its hollow interior cannot become filled with water, thus offsetting its highly important flotation factor.

An annular groove 17 extends completely around said drum at its transverse center and affords a guide channel for the control wound therearound and its outer circumferential surface may be transversely grooved or minutely toothed or roughened to afford a better engagement of the rotating drum as it engages the under ice surface, as will be presently described. These ice engaging surfaces are, however, shown only as smooth on the drawing.

A line or cord guide in the form of an eye 18 is rigidly affixed to the lower edge portion of the central spacer block 13 of the secondary frame at its longitudinal center. Mounted in the central spacer block 13 at an upwardly and rearwardly inclined angle is a sharp metallic ice engaging point 19. This point 19 is mounted in said member 13 for relatively tight endwise movement and is tightly locked in its desired predetermined position relative to its engagement with the under surface of the ice sheet by a set screw 20 which engages the shank portion of said point 19 when turned down into engagement therewith. A cord or line 21 having a weight member 22 on its extreme forward end portion provides motivation for the unit by cooperation with the rotating drum member 15, as will be presently described.

A further cord guide 23 in the form of a U-shaped yoke, its closed end portion outwardly extended, is rigidly affixed at the longitudinal center of the lower crosstie member 9 of the main frame. This guide member 23 is in alignment with the annular groove 17 on the drum 15 and affords free swinging but guided control over the depending weighted end of the cord 21. Said guide member 23 further functions to limit the upward movement of the weight member 22 so that it cannot be drawn upwardly to such an extent that it will interfere with the free rotation of the drum 15.

The control or motivating cord 21 is looped once around the drum 15 in its annular groove 17 in the manner shown in Fig. 2 and the weight member 22 is attached to one end portion after it has been passed through the cord guide 23. The other end portion of the cord 21 is thence passed over the crosstie member 9 and through the eye or cord guide 18 and thence continuing rearwardly to the hands of the operator.

It will be obvious at this time that the device is motivated by the operator by pulling on the free end portion of the cord 21 until the weight member 22 is stopped by its engagement with the cord guide 23. Thence, by slowly releasing the restriction on the cord 21, the weight 22 is free to move downwardly by gravity to the depth of the water beneath the ice sheet. In so doing, the cord 23 in frictional engagement with the drum 15 in its annular groove 17 will rotate the said drum in a clockwise direction.

While the entire unit is buoyant, and the entire unit is engaging the under surface of the ice sheet with four-point contact at numeral 6 of the main frame, the greater buoyancy imparted to the floating secondary frame by virtue of the watertight drum 15 will impart a still greater force factor of the floating frame and its mounted drum 15 with the under surface of the ice sheet.

Thus, with the unit in position under the ice sheet adjacent the launching hole, with the weight in its uppermost position, the operator commences to release the cord 21 which, in turn, rotates the cooperating drum 15 which, being in buoyant contact with the under ice surface, will impart forward movement to the unit by such rotating contact.

The length of the operating or motivating control cord may, of course, be varied according to the distance from the operator it is desired to send the unit under ice. When the weight member 22 reaches the bottom of the water being traversed, it is, of course, necessary to retrieve the weight to its uppermost position and repeat the cycle as often as desired, dictated only by the length of said control cord 21 and the water area. It will be understood that the retrieve of the weight member 22 should be stopped just short of its uppermost position and contact with the guide member 23 in order that contact of the point 19 with the endwise surface is not overcome, as will presently be further described.

When the weight member 22 reaches water bottom, the operator becomes aware of it because of the slackness of the control cord and thence the retrieve is indicated and commenced. At this point the point 19 that is rearwardly angularly disposed becomes a fulcrum point and will engage the under ice surface and anchor the entire unit while the weight is retrieved to near its uppermost position. The weight member 22, through a series of cycles to impart forward motion to the unit, is preferably not brought into engagement with the cord guide 23. The reason for limiting this engagement of these members is that when the weight member 22 and the cord guide 23 are brought into tight engagement by tension of the cord 21 imparted by the operator, the main and secondary frames are thus locked together to function as a single frame and the buoyancy of the entire unit is thus transmitted to the outer frame at its four points of contact with the under ice surface. This locking of the respective frames imparts a downward or lowering force to the secondary or floating frame, thus withdrawing its under ice engaging components, i.e. the drum 15 and the point 19 from contact with said under ice surface, thus permitting the full retrieve of the unit to the operator as long as the engagement of the members 22 and 23 is maintained by a taut line and the operator. It is again important to note that practice with the device will improve the efficiency of its operation and the smooth steady release of the weight to impart forward movement of the unit is important to insure proper engagement of the drum surfaces 15 with the under ice surface. The same principle of operation should be applied as in the case of any wheel in contact with ice.

Briefly then, to recapitulate a cycle of operation, the unit as an entirety will move forward under ice a predetermined distance by engagement of the outer drum surface with the under ice surface, said drum being motivated by the action of the weighted cord passing around and rotating the drum by the action of gravity on said weight member. When said weight member attached to the operator-held control cord reaches water bottom, the weight is retrieved by the operator until it almost contacts its stop member and/or line guide. At this point and during the entire retrieve, the greater buoyancy of the secondary frame mounting the drum and anchor point, has forced said anchor point that is rearwardly angularly and upwardly projected from said secondary frame into the under ice surface as a base of resistance to overcome the pull of the cord while the weight is retrieved or raised to near its uppermost position. Thereafter, the line is again released to commence another cycle of forward movement and the point will then offer no resistance to the under ice surface because of its angular arrangement and position. During forward movement, said point will merely function with very light contact, as a skid.

It is important to note at this point that, during the retrieve of the weight member 22 by the operator's rearward pull on the cord 21, the anchor point 19 is in engagement with the under ice surface and its bite on said surface is such that the entire unit will remain stationary as long as rearward pull and tension on the cord 21 is maintained. The anchor point 19 at this time becomes a pivot point of the secondary frame and its mounted components and thus overcomes the inherent buoyancy of the secondary frame assembly by shifting the weight thereof forwardly to lower the outer surface of the drum 15 out of engagement with the under ice surface.

The object of this shifting of the pivot point of the secondary frame is primarily to disengage the drum 15 from the under ice surface during the retrieve of the weight member 22. In this operation, the drum 15 is obviously being rotated by the action of the cord 21 thereon and if it were to remain in contact with said ice surface during the rewind or retrieve of the weight, there would be two undesirable effects therefrom which are as follows: First, the rotating drum 15 being held stationary by the anchor point 19, could, by virtue of its serrated or otherwise tractionized peripheral surface, cut a transverse groove in the under ice at the specific point where the rewind or retrieve of said weight takes place, thus making it necessary for the unit to pull out of this inadvertently formed groove as it commences its forward motion again as tension on the cord is released to permit the weight member 22 to drop, thus imparting forward motion to the drum 15 and similarly the entire unit. Secondly, if the drum 15 were not disengaged from the under ice surface, the rotation of the drum during such engagement would obviously require a greater tension or rearward pull on the cord 21 to overcome the friction of the drum 15 rotating in contact with the ice. This would, of course, cause the anchor point 19 to more firmly embed itself in the under ice surface, a factor to also be overcome by the action of gravity on the weight member 22 when forward motion is again commenced. The foregoing is highly important to the successful operation of the device and hence must not be overlooked.

When the unit has reached its predetermined destination after an under ice traverse, it may be used as a support for a tackle assembly to function as a float or bobber, and/or it may be provided with any one of sundry means whereby a fishing line and attached tackle assembly is released from the unit at the distant point and the tackle retrieved as in trolling.

Obviously, it is necessary to retrieve the unit also and in so doing, the cord is drawn taut until the weight member and cord guide are in tight arrangement, which action, by overcoming the buoyancy of the secondary floating frame breaks contact of the drum and point mounted on said secondary frame with the under ice surface and thus permits the entire unit to be retrieved by the operator by sliding movement on the four points of the main outer frame, as indicated by the numeral 6.

In actual use, it has been found that it is most satisfactory to first determine the water depth of an area to be fished, thence to set the device in operation, towing its attached tackle assembly at the proper depth for fishing, and thence continuing to reactivate the motive power by a series of relatively short pulls on the cord 21, thence releasing the same to permit a relatively short downward projection of the weight 22, and thence repeating the procedure to cover the area.

When the device is used to tow an independent tackle assembly connected to a rod of conventional design, I provide a pair of crossed wire fingers 25 attached to the rear end portion of the side plates 4 of the outer frame and having relatively tight contact the one with the other at their overlapping portions to thus retain a towed line until released by a substantially heavy tug of the line by the operator. At such time, the independent tackle falls away free from the towing device and is retrieved in a normal fashion.

While there are herein disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. An under ice towing and launching device comprising in combination, an elongated buoyant outer frame, an elongated buoyant inner frame pivotally mounted in one end portion of the outer frame for vertical movements relative to said outer frame, a wheel in the form of a watertight buoyant drum mounted for axial rotation in the inner frame, intermittent means for rotating said drum, said drum having inherent buoyant engagement at its peripheral surfaces with the under surface of a sheet of ice, and means mounted in said inner frame to anchor the device against rearward movement while said means for rotating the drum is reactivated.

2. The structure defined in claim 1 wherein the buoyancy factor of the inner frame and drum is greater than said buoyancy factor in the outer frame.

3. The structure defined in claim 1 wherein the peripheral ice-engaging surface of the drum is serrated or roughened to afford a better purchase on the under ice surface.

4. The structure defined in claim 1 wherein the means for rotating the drum is a cord passed circumferentially therearound, a weight on one end of said cord arranged to seek water bottom level by the force of gravity, the other end of said cord being of indeterminate length and held by the operator, said combined weight and cord being passed around the said drum cooperating to rotate the same as the weight descends by gravity to bottom levels of the water being traversed under ice, control cord guide means on said outer frame cooperating with said weight member to lock together by cord tension said inner and outer frames, thus creating a factor of unitary buoyancy of the inherent buoyancy of the inner and outer frames and mounted components, and an annular groove at the transverse center of the drum to afford a cord guide.

5. The structure defined in claim 1 wherein the anchor means to limit rearward movement of the unit is a pointed metal pin, said pin being endwise adjustable, and means for locking said pin in a predetermined position.

6. The structure defined in claim 1, further including a pair of crossed spring wire fingers rigidly attached at their inner end portions to the rear end portion of the frame of the towing device, thus affording means for towing and depositing an independent tackle assembly.

7. The structure defined in claim 1, wherein the device is so formed that the pivot point of the buoyant secondary frame is transposed from its rear end portion forwardly thereof to the anchor point mounted thereon whereby the inherent buoyancy of said secondary frame is overcome by the shifting of the weight factor or specific gravity of the secondary frame relative to the outer frame to thus disengage the buoyant water tight drum from engagement with the under ice surface while the unit is stationary during the retrieve and rewind of the weight member on the drum.

References Cited in the file of this patent

UNITED STATES PATENTS

| | | |
|---|---|---|
| 1,163,193 | Althoff | Dec. 7, 1915 |
| 2,488,464 | Arpin | Nov. 15, 1949 |
| 2,734,300 | Mandel | Feb. 14, 1956 |